(12) United States Patent
Geyer et al.

(10) Patent No.: US 7,255,365 B2
(45) Date of Patent: Aug. 14, 2007

(54) AIR BAG MODULE WITH ADJUSTABLE COVER

(75) Inventors: David L. Geyer, Sterling Heights, MI (US); Ronald J. Misetich, Rochester Hills, MI (US); Darrell A. Kellogg, Belleville, MI (US); Michael A. Schorle, Saint Clair Shores, MI (US); Peter L. Vigeant, Troy, MI (US)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/961,973

(22) Filed: Oct. 8, 2004

(65) Prior Publication Data

US 2005/0082794 A1 Apr. 21, 2005

Related U.S. Application Data

(60) Provisional application No. 60/512,168, filed on Oct. 17, 2003.

(51) Int. Cl.
*B60R 21/16* (2006.01)

(52) U.S. Cl. .............. 280/732; 280/728.2; 280/728.3

(58) Field of Classification Search ............ 280/728.2, 280/732, 728.3
See application file for complete search history.

(56) References Cited

U.S. PATENT DOCUMENTS

| | | | | |
|---|---|---|---|---|
| 5,060,972 A | 10/1991 | Satoh et al. | ............... | 280/732 |
| 5,303,951 A | 4/1994 | Goestenkors et al. | ... | 280/728 B |
| 5,348,339 A | 9/1994 | Turner | ................... | 280/728 B |
| 5,460,400 A | 10/1995 | Davidson | ................. | 280/728.2 |
| 5,474,323 A | 12/1995 | Davidson | ................. | 280/728.2 |
| 5,564,732 A | 10/1996 | Bauer et al. | | |
| 5,788,269 A | 8/1998 | Jakovski et al. | ......... | 280/728.2 |
| 5,899,485 A | 5/1999 | Folsom et al. | ........... | 280/728.2 |
| 6,010,146 A | 1/2000 | Otsuka et al. | ........... | 280/728.2 |
| 6,039,341 A | 3/2000 | Doxey et al. | ............ | 280/728.2 |
| 6,161,865 A | 12/2000 | Rose et al. | ............... | 280/728.3 |
| 6,199,899 B1 | 3/2001 | Krebs et al. | ................ | 280/731 |
| 6,237,936 B1 * | 5/2001 | Quade et al. | ............ | 280/728.2 |
| 6,296,270 B1 * | 10/2001 | Amamori | ................. | 280/728.2 |
| 6,325,407 B1 * | 12/2001 | Soderquist | ............... | 280/728.2 |
| 6,394,485 B1 | 5/2002 | Amamori | ................. | 280/728.2 |
| 6,543,802 B1 * | 4/2003 | Uchiyama et al. | ....... | 280/728.2 |
| 6,572,135 B2 | 6/2003 | Lang | ........................ | 280/728.2 |
| 6,902,185 B2 * | 6/2005 | North | ...................... | 280/728.3 |
| 6,991,252 B2 * | 1/2006 | Enders | .................... | 280/728.1 |
| 2001/0022440 A1 | 9/2001 | Lang | | |
| 2002/0024197 A1 | 2/2002 | Thomas et al. | | |

(Continued)

FOREIGN PATENT DOCUMENTS

JP    H10-244899    9/1998

*Primary Examiner*—Eric Culbreth
*Assistant Examiner*—Barry Gooden, Jr.
(74) *Attorney, Agent, or Firm*—Akerman Senterfitt; Jean C. Edwards, Esq.

(57) ABSTRACT

An air bag module including a canister and a cover coupled to said canister. One of the cover and canister has a projection and the other of the cover and canister has an opening. The projection is disposed in the opening and engages the other of the cover and canister to restrict movement of the cover relative to the canister and create a frictional force acting to resist movement of the cover relative to the canister.

9 Claims, 11 Drawing Sheets

U.S. PATENT DOCUMENTS

| | | |
|---|---|---|
| 2002/0063415 A1 | 5/2002 | Uchiyama et al. |
| 2002/0084630 A1 | 7/2002 | Aulbach |
| 2002/0153711 A1 | 10/2002 | Bleber et al. |
| 2004/0046371 A1* | 3/2004 | Lee et al. ............. 280/732 |
| 2004/0061315 A1* | 4/2004 | Schneider ........... 280/728.2 |
| 2004/0145164 A1* | 7/2004 | North .................... 280/732 |
| 2004/0262889 A1* | 12/2004 | Roychoudhury ..... 280/728.2 |
| 2005/0035574 A1* | 2/2005 | Seo ...................... 280/728.2 |
| 2005/0110245 A1* | 5/2005 | Hurst ................... 280/728.2 |
| 2006/0022435 A1* | 2/2006 | Tsujimoto et al. ... 280/728.2 |

* cited by examiner

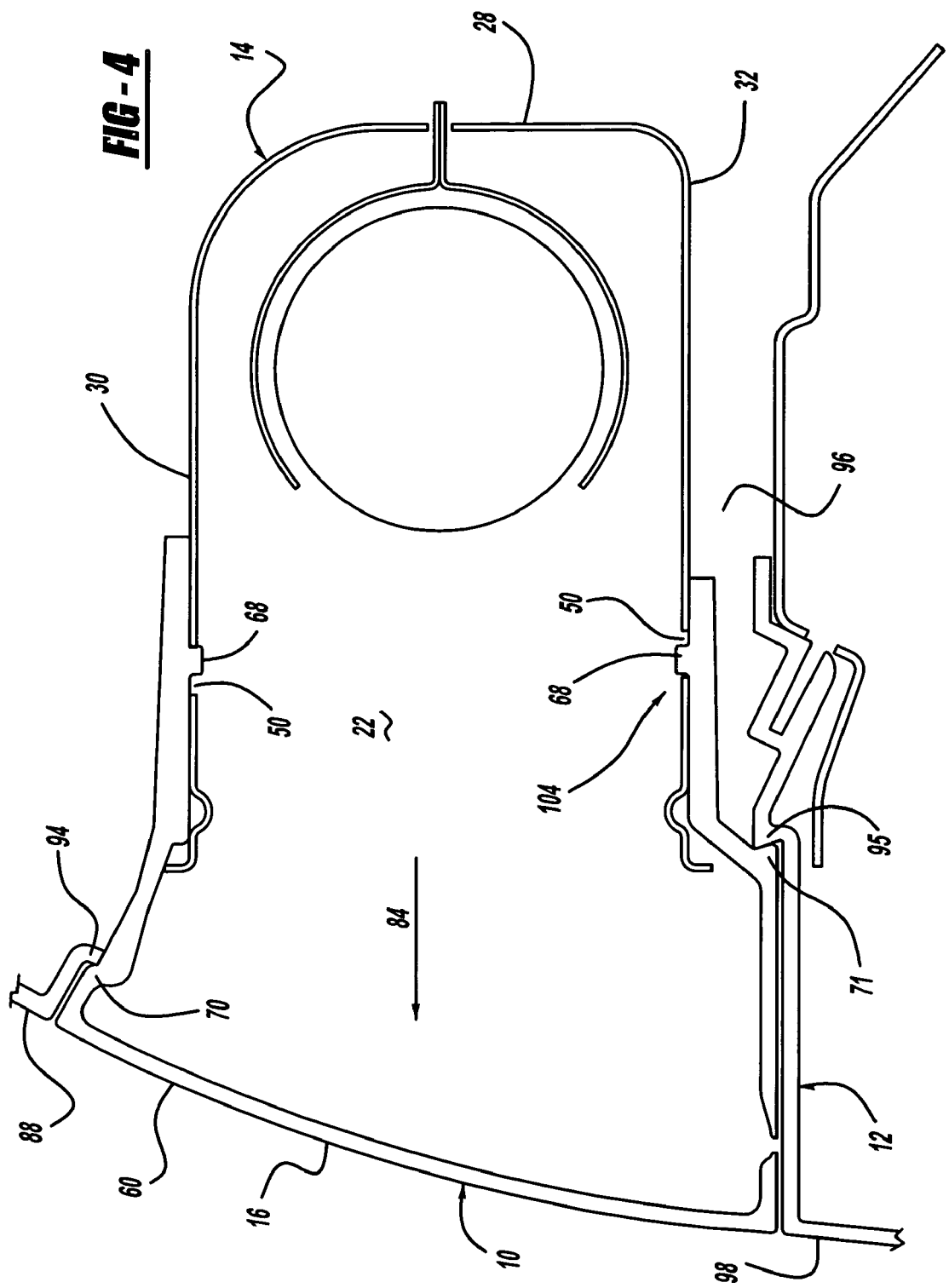

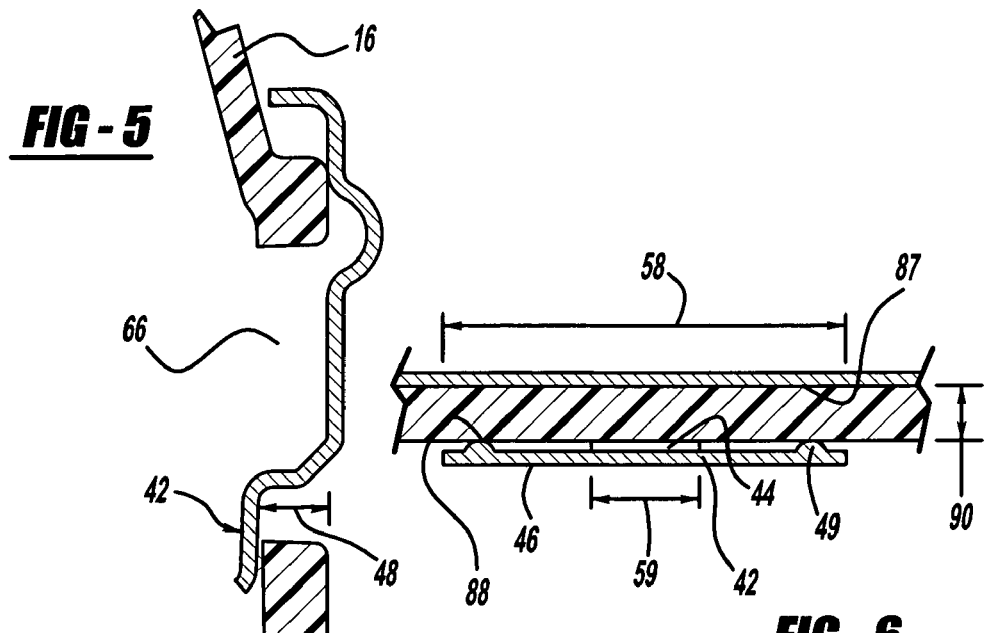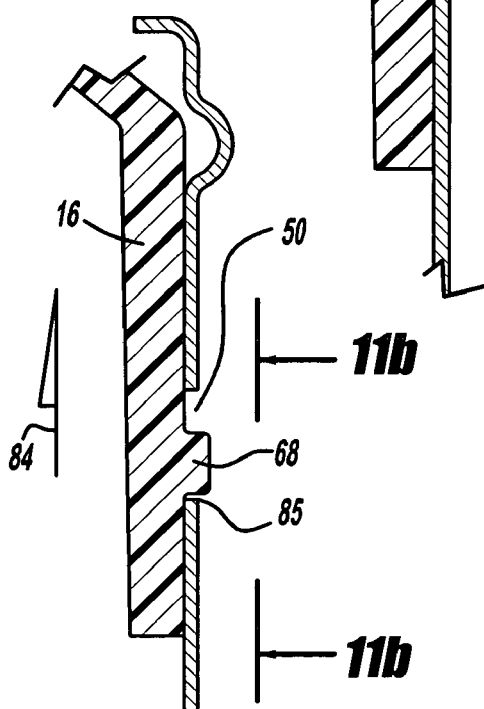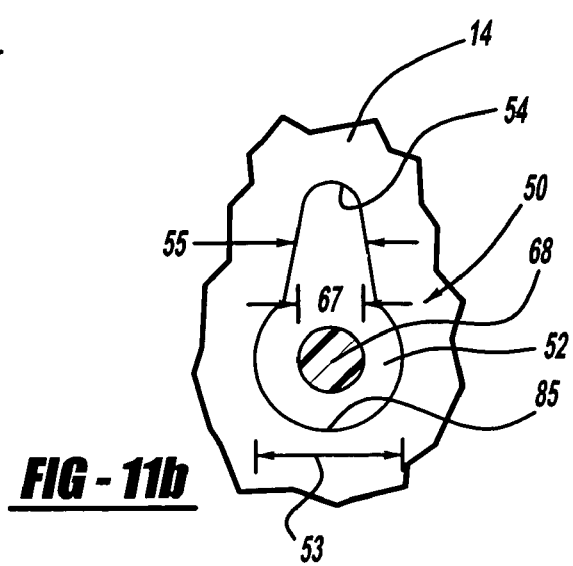

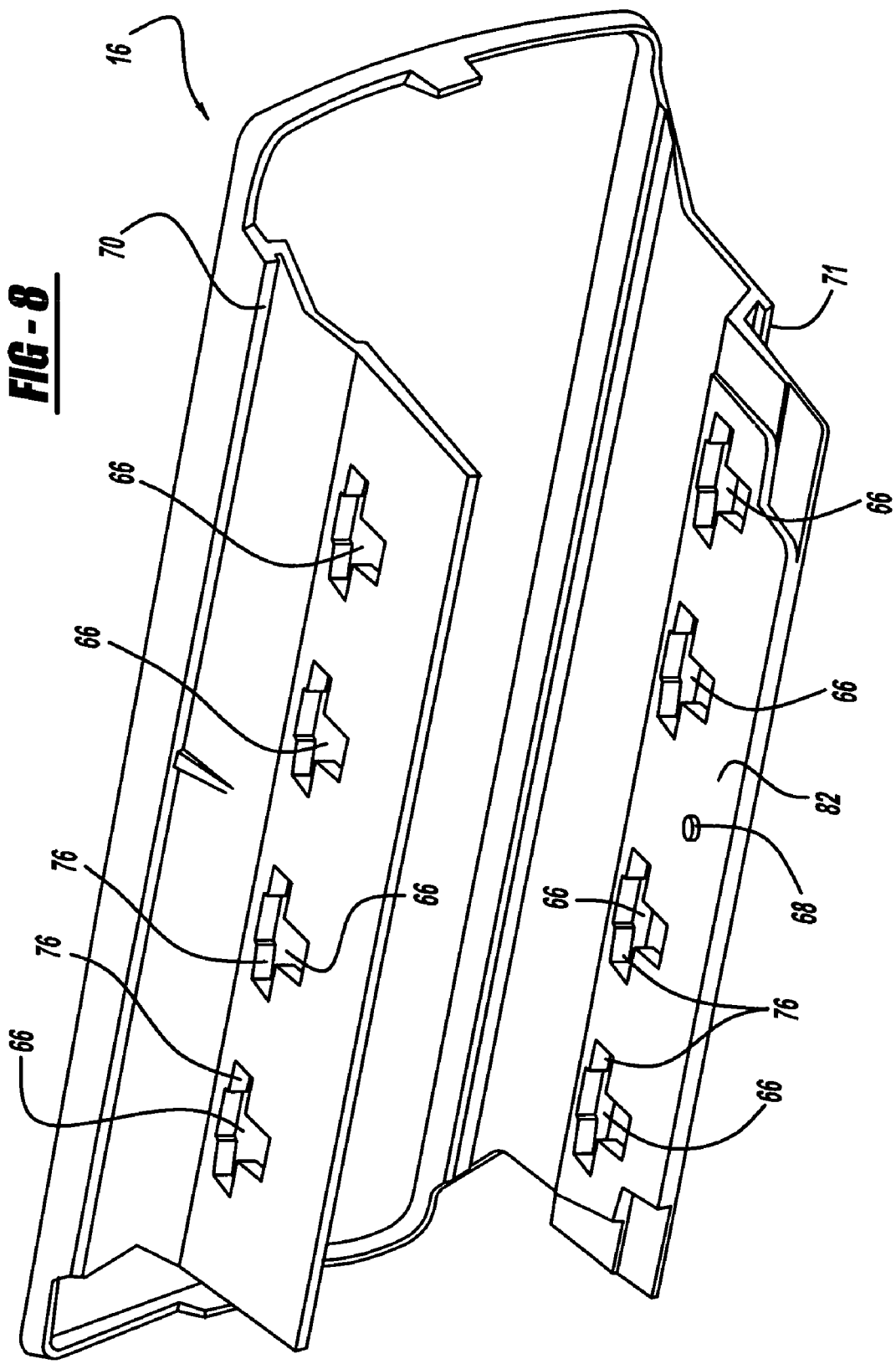

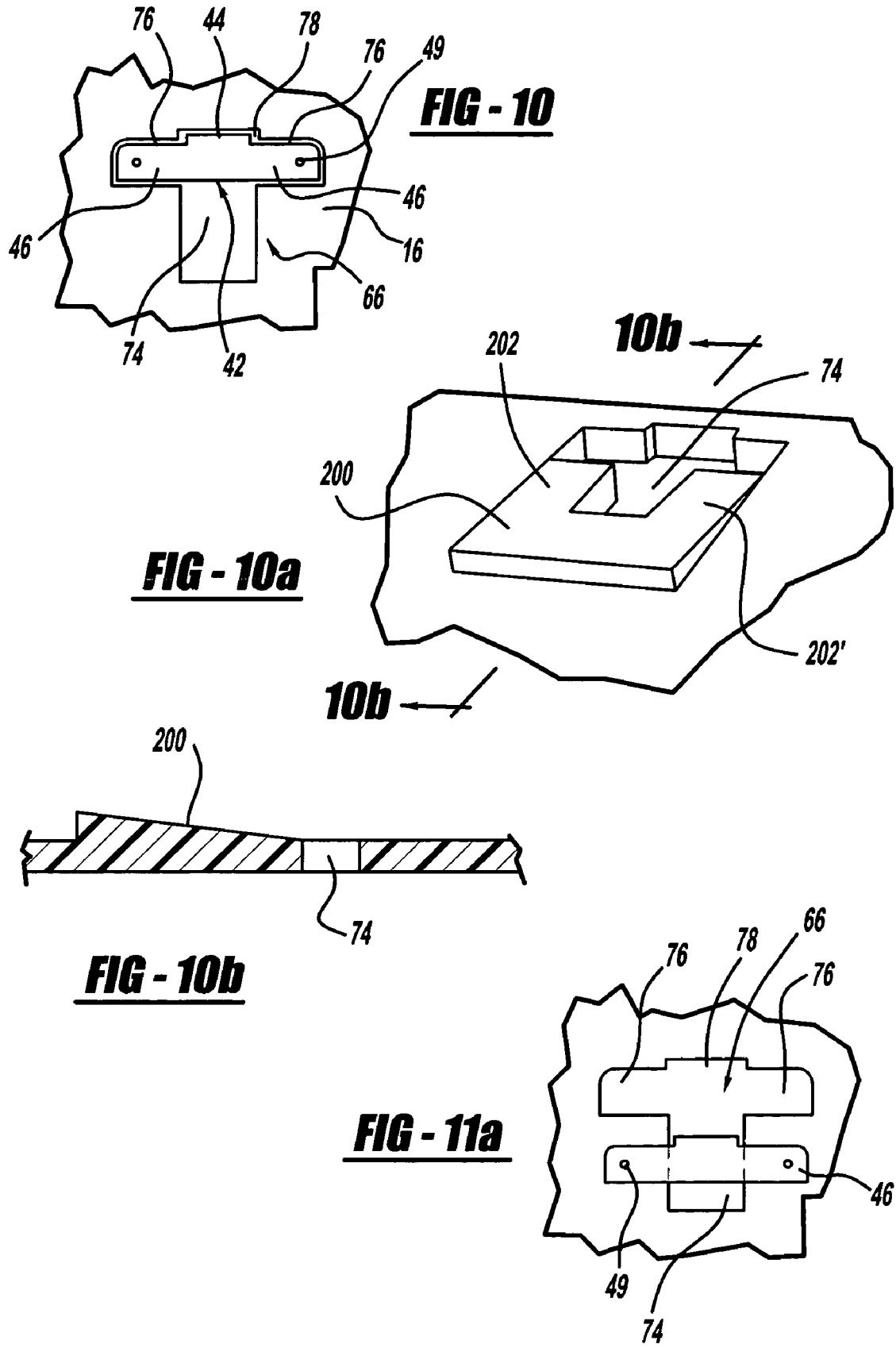

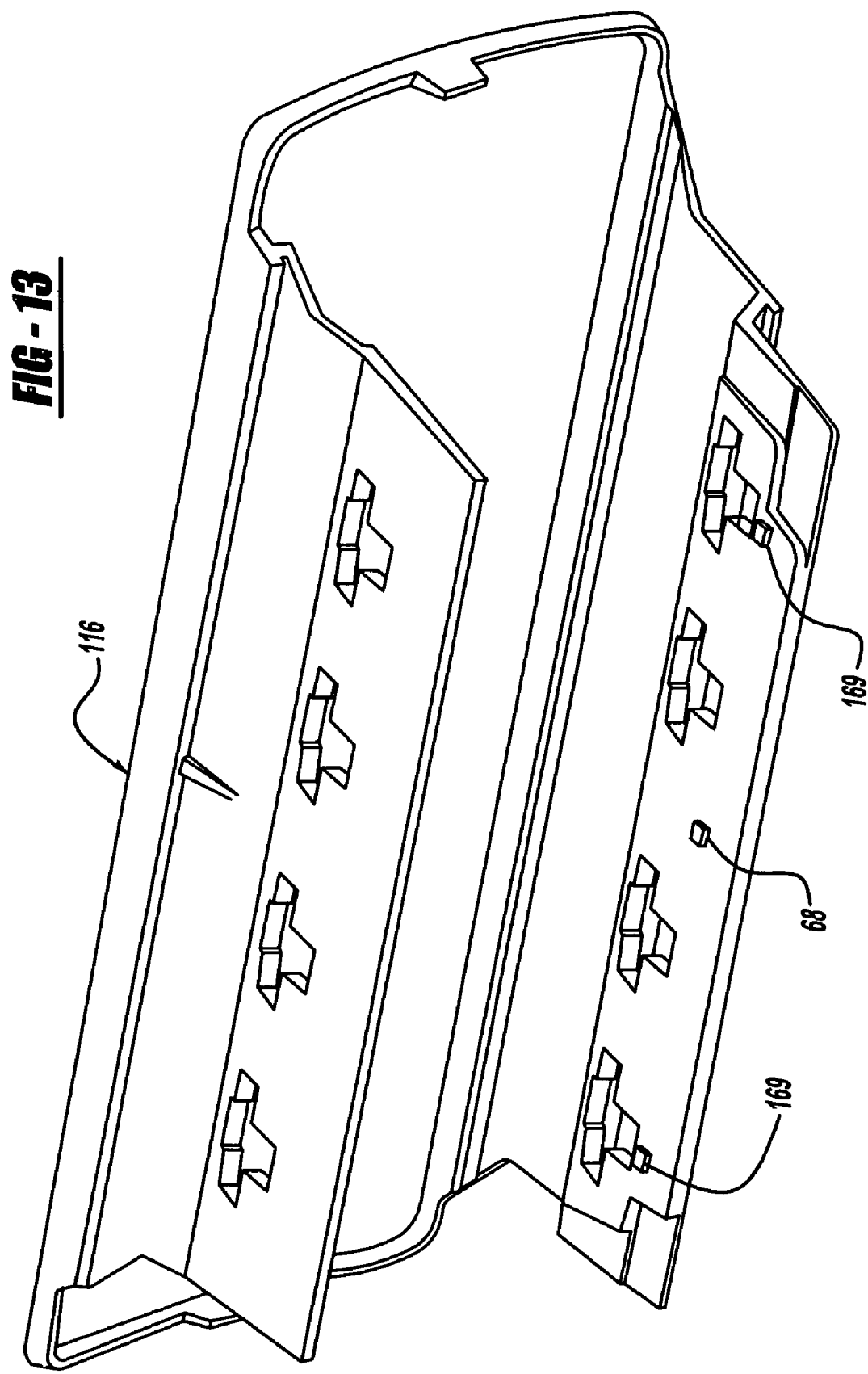

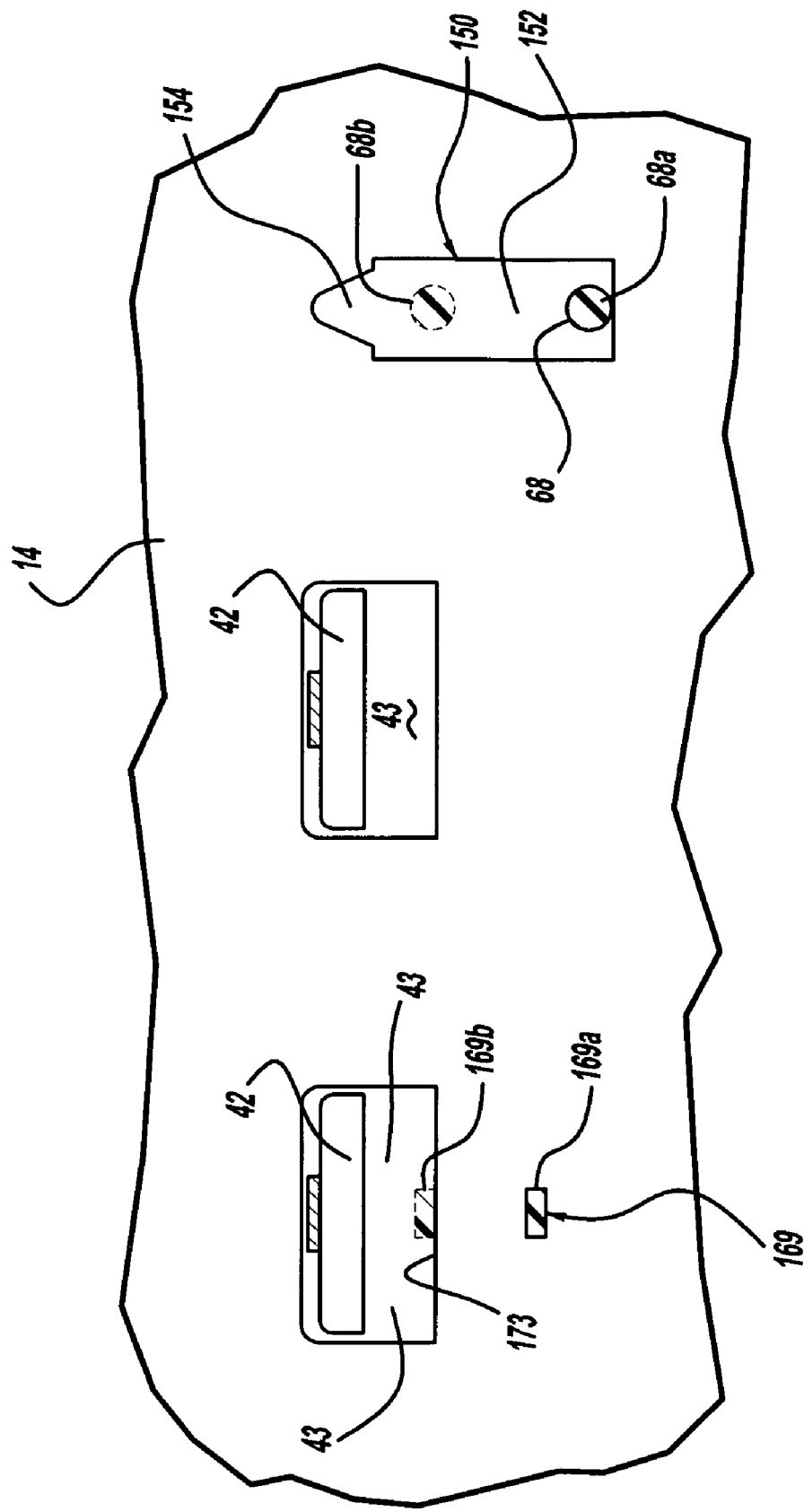

AIR BAG MODULE WITH ADJUSTABLE COVER

CROSS-REFERENCE TO RELATED APPLICATION

This application claims the benefit of U.S. Provisional Application No. 60/512,168, filed Oct. 17, 2003, the entire disclosure of this application being considered part of the disclosure of this application and hereby incorporated by reference.

BACKGROUND OF THE INVENTION

The present invention is directed to an air bag module for a vehicle and, more particularly, to an air bag module having a cover coupled to a canister by a connection assembly that permits movement of the cover relative to the canister during assembly, to facilitate achievement of a proper fit and finish relative to the vehicle's instrument panel.

The fit and finish of visible interior components of a vehicle (i.e., class A surfaces) are of critical importance to vehicle manufacturers, suppliers, and purchasers. One area where the fit and finish is particularly important is the vehicle's instrument panel and the components that are coupled thereto. Suppliers in the automotive industry have developed a variety of approaches to improve the fit and finish of these components. Despite these efforts, a need remains for improved component configurations and assembly methods.

An area of particular interest is the fit and finish of air bag modules with other class A surfaces. In order to achieve widespread acceptance in the automotive industry, the configuration of the air bag module should address a number of competing interests. For example, the module should securely attach to its supporting structure, permit unimpeded operation of the restraint system, present an attractive appearance to the vehicle operator, simplify the assembly process, and be capable of production in a cost effective manner. Despite numerous attempts to satisfy these demands, a need exists for an improved air bag module.

SUMMARY OF THE INVENTION

The air bag module of the present invention is directed to the above discussed deficiencies in the art and includes a cover coupled to a canister by a connection assembly that permits movement of the cover relative to the canister during connection of the module to a vehicle's instrument panel. In the illustrated embodiment, the connection assembly includes a first connection mechanism having cooperating tabs and cutouts respectively formed on the cover and/or canister, and a second connection mechanism having a cooperating locking nub and locking slot also respectively formed on the cover and/or canister. Each of the first and second connection mechanisms permits movement of the cover relative to the canister in a single fore-aft plane and, further, one or both of the connection mechanisms provide an interference fit and/or frictional resistance to maintain the cover/canister position prior and subsequent to installation of the air bag module in the instrument panel.

The instrument panel includes shelves that cooperatively engage shoulders on the cover to set the cover relative to the instrument panel surface as the airbag module is assembled into the instrument panel. The cooperating shoulders and shelves allow easy assembly and creation of a substantially smooth panel surface between the cover and instrument panel without having to adjust for multiple tolerance stack-ups. More specifically, the shelves engage the shoulders as the airbag canister is tightened down to be secured within the vehicle. The cover then slides relative to the canister to maintain a substantially smooth surface between the cover and instrument panel as the canister is further tightened.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 4 is a cross section similar to that shown in FIG. 3 illustrating the air bag module coupled to the instrument panel and the cover in its final installed position relative to the canister;

FIG. 5 is a sectional view of a portion of the canister and cover of the air bag module taken along the line 5-5 shown in FIG. 1 and showing the tab and cutout of the first connection mechanism;

FIG. 6 is a sectional view of a portion of the canister and cover of the air bag module taken along the line 6-6 shown in FIG. 1 and showing the engagement of the tab with the cover;

FIG. 7 is a sectional view of a portion of the canister and cover of the air bag module taken along the line 7-7 shown in FIG. 1 and showing the disposition of the locking nub in the locking slot when the cover is in its neutral position;

FIG. 8 is a perspective view of the air bag module cover;

FIG. 10 is a plan view showing the location of a tab relative to a cover cutout when the cover is in its initial position relative to the canister;

FIG. 10a is a perspective view of an alternate embodiment of the arrangement for engaging the tab of the canister with the cover in which a ramp is provided to effect a gradually-increasing interference fit;

FIG. 10b is a sectional view of the alternate embodiment for engaging the tab of the canister with the cover taken along line 10b-10b of FIG. 10a;

FIG. 11a is a plan view showing the location of a tab relative to a cover cutout when the cover is in a position between the initial position (of FIG. 10) and the final installed position (of FIG. 12a) relative to the canister;

FIG. 11b is an enlarged view taken between the cover and canister showing the location of a locking nub in a locking slot when the cover is in its neutral position relative to the canister;

FIG. 13 is a perspective view similar to that shown in FIG. 8 showing a second embodiment of the air bag module cover; and FIG. 14 is a sectional view taken between the cover and canister of the second embodiment showing the location of first and second nubs in the locking slot and canister cavities when the cover is in an initial position and a neutral position relative to the canister.

DETAILED DESCRIPTION OF THE PREFERRED EMBODIMENTS

Figure 2:
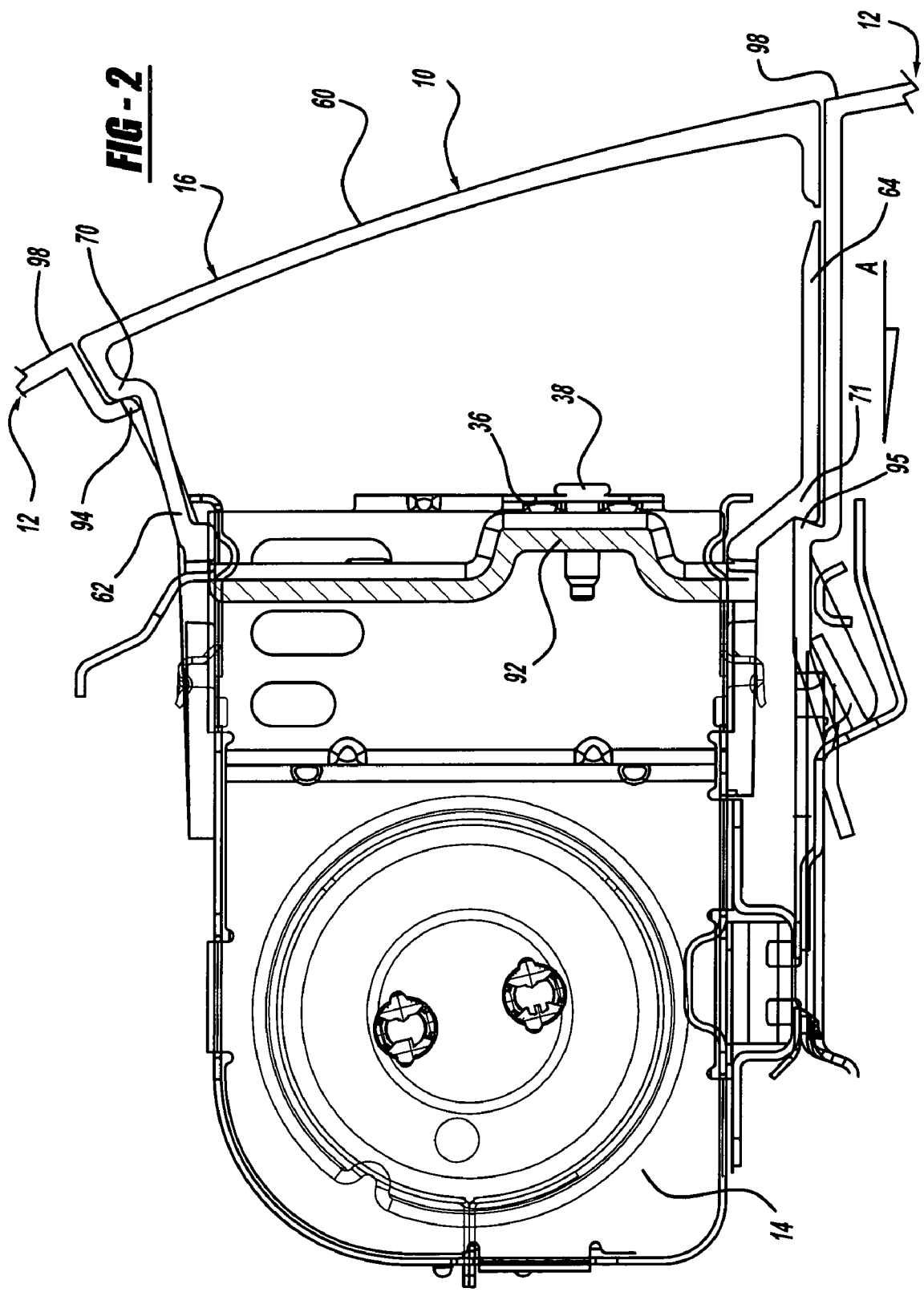
FIG. 2 is a partial cross section through an instrument panel showing the air bag module of the present invention coupled to the instrument panel.

An illustrative embodiment of an air bag module 10 according to the present invention attached to an instrument panel 12 (FIG. 2) will now be described with reference to the attached drawings. The air bag module 10 is shown to include a canister 14 fixed to the instrument panel 12, a cover 16 coupled to the canister 14, an inflator 18 coupled to the canister 14, and an air bag (not shown) operably coupled to the inflator 18 and disposed within a cavity 22 formed by the cover 16, and the canister 14. While the air bag module 10 and instrument panel 12 are illustrated and described herein for a passenger air bag installation, those skilled in the art will appreciate that the module and the novel features thereof are equally suited for other installations including, but not limited to, driver and side air bag restraint systems.

Figure 1:
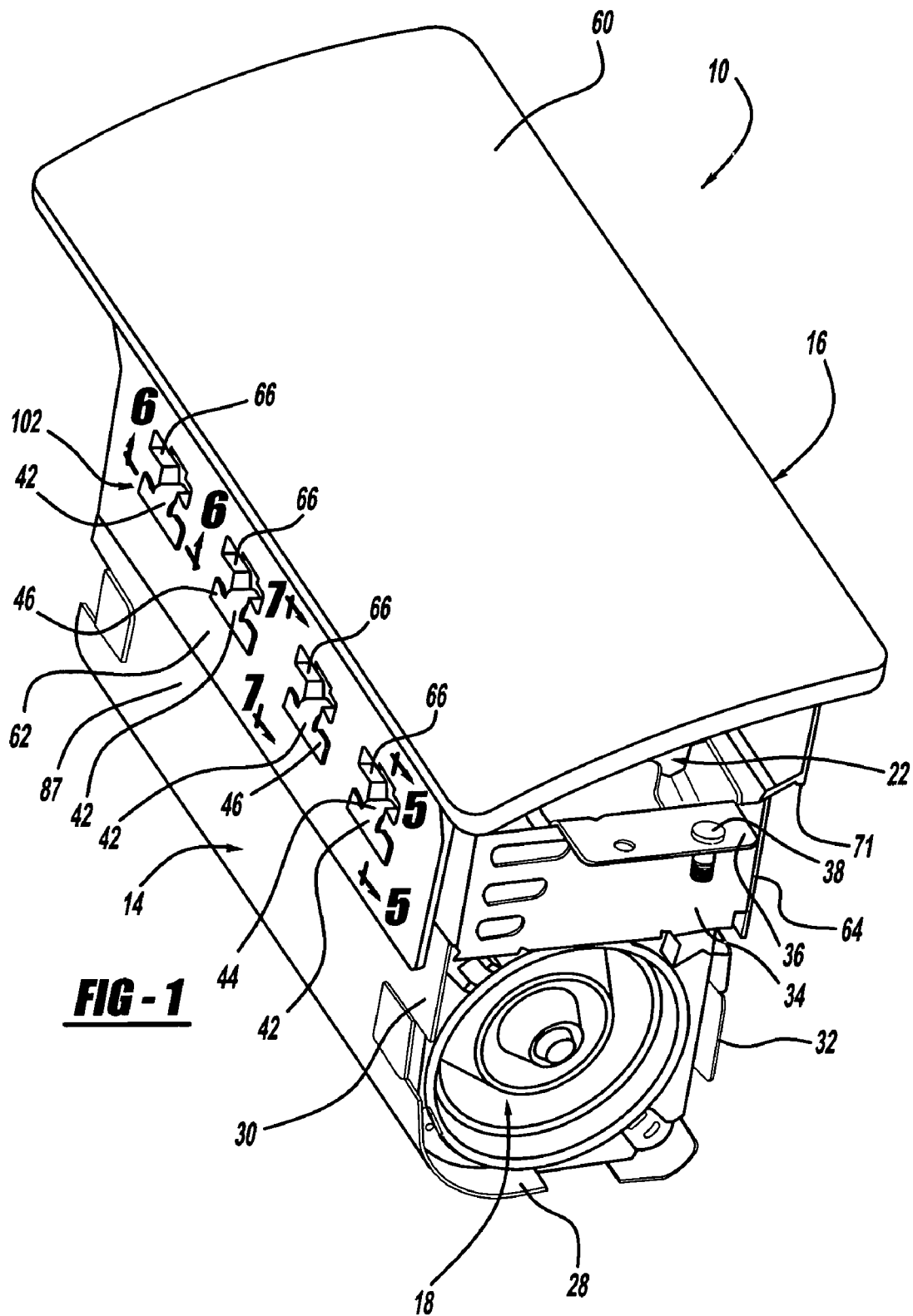
FIG. 1 is a perspective view of an air bag module according to the present invention.
Figure 3:
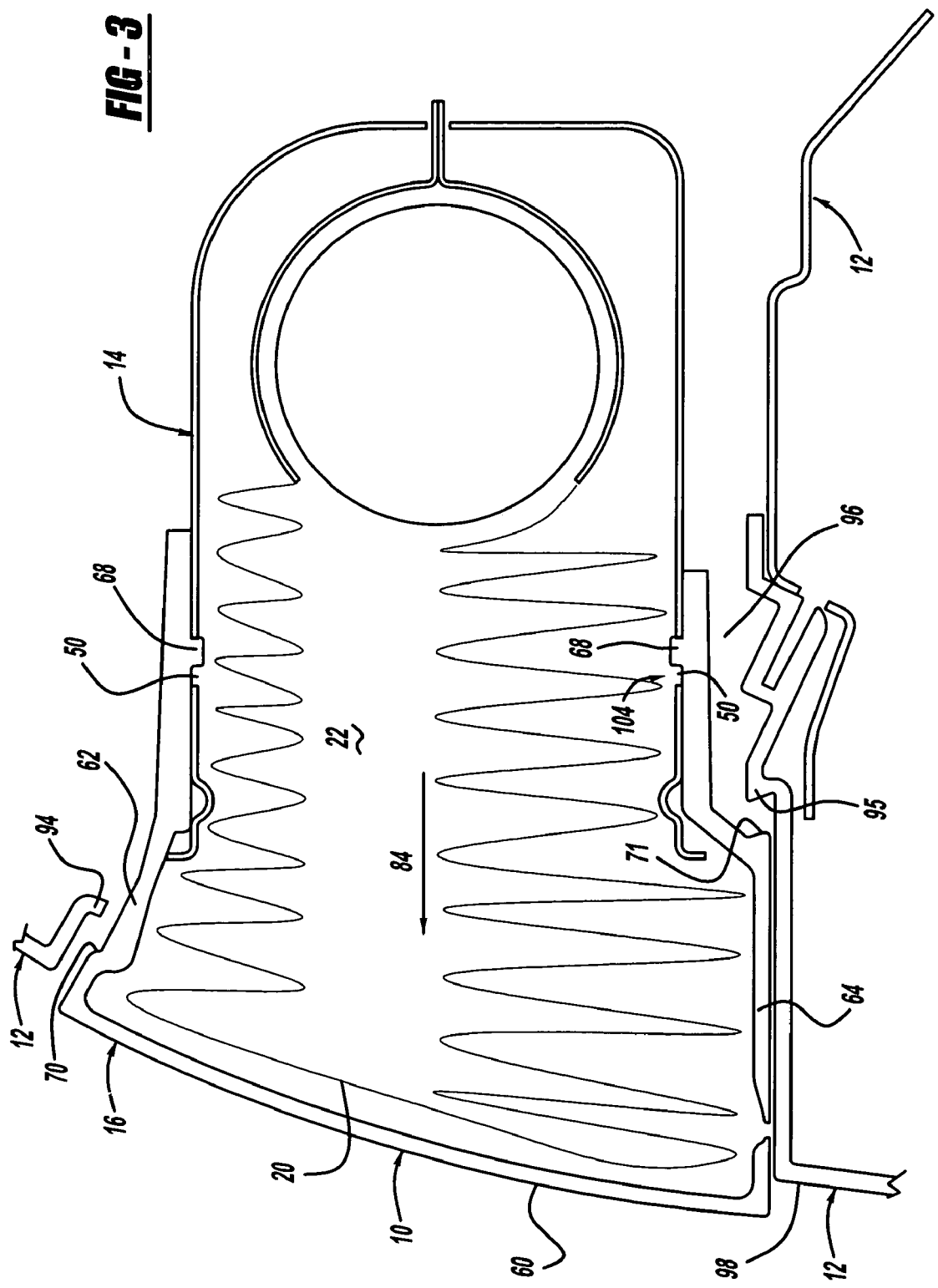
FIG. 3 is a partial cross section through the instrument panel and air bag module showing the air bag module disposed in the instrument panel and the cover in its neutral position relative to the canister.

The canister 14 and cover 16 define a first connection mechanism 102 (FIG. 1) and a second connection mechanism 104 (FIGS. 3-4) that couple the cover 16 to the canister 14 while permitting movement of the cover 16 relative to the canister 14 during installation of the airbag module 10 to the instrument panel 12. In the illustrated embodiment, the first connection mechanism 102 includes tabs 42 on the canister 14 that are received within cutouts 66 on the cover 16. When the air bag module 10 is assembled, the tabs 42 engage the cover material proximate the cutouts 66 (FIGS. 5 and 6) to movably couple the cover 16 to the canister 14. This coupling is enhanced by the second connection mechanism 104 which includes a locking nub 68 (FIGS. 7 and 8) projecting from the cover 16 and configured to be disposed in a locking slot 50 on the canister 14. In the illustrated embodiments, the first and second connection mechanisms 102 and 104 provide limited slip interfaces between the cover 16 and canister 14. As used herein, a "limited slip interface" permits movements of the cover 16 relative to the canister 14 within a predetermined range while also creating an interference fit and/or frictional force that acts to restrain movement over a portion, or all, of the predetermined range. The incorporation of one or more limited slip interfaces provides numerous benefits relative to conventional cover/canister coupling arrangements including prevention of rattling as well as undesired movement of the cover 16 prior and subsequent to installation of the air bag module 10 in the instrument panel 12. Prevention of movement of the cover 16 relative to the instrument panel 12 after installation is particularly beneficial as it maintains the original and desired fit and finish of the cover 16 relative to the instrument panel 12.

Figure 9:
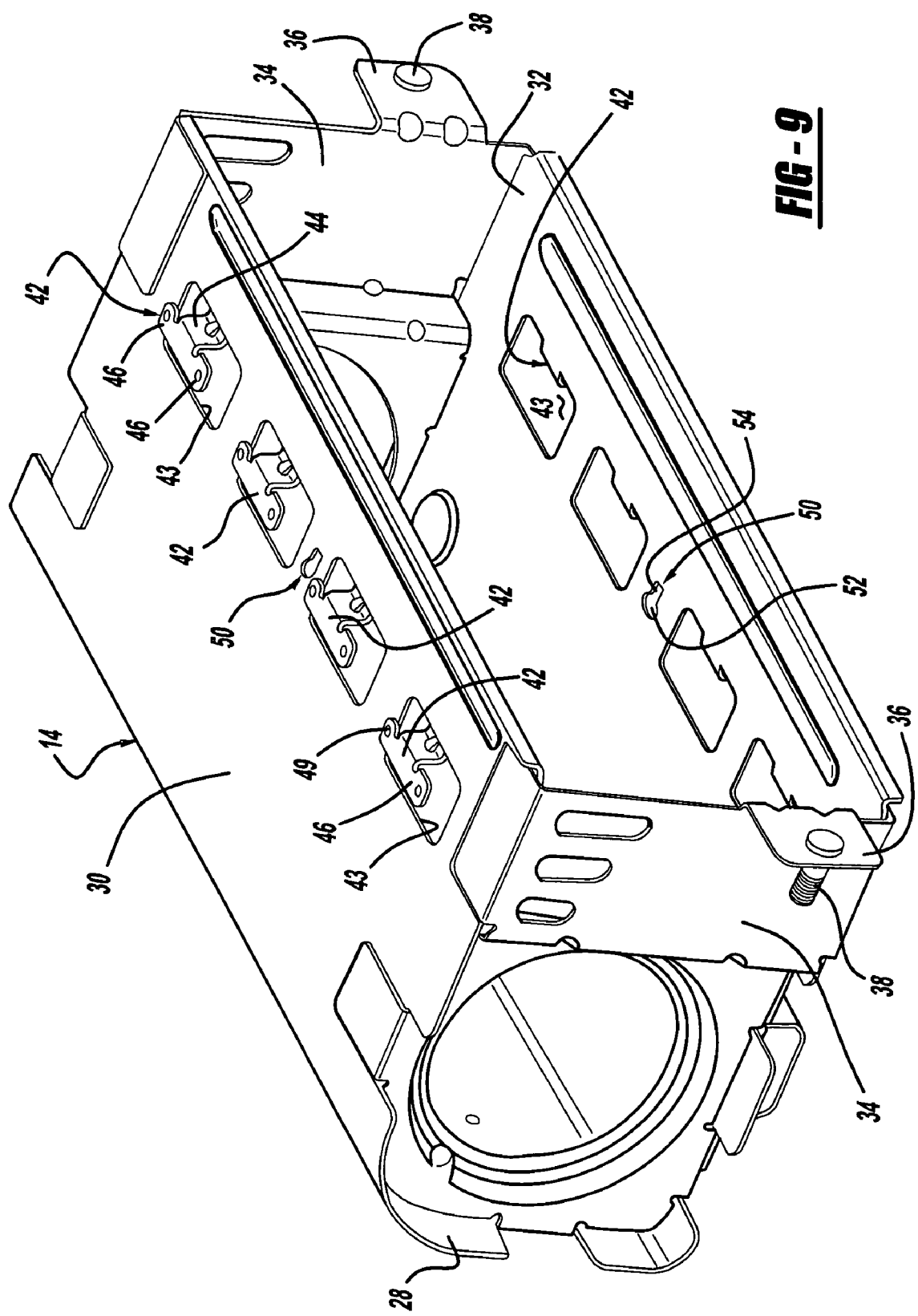
FIG. 9 is a perspective of the air bag module canister.

As is most clearly illustrated in FIG. 9, the canister 14 includes a back 28, opposed side walls 30 and 32 extending from the back 28, sides 34, and mounting flanges 36 extending from the sides 34. Fasteners 38 are coupled to the mounting flanges 36 for fixing the canister 14 to the instrument panel 12. Fasteners 38 are coupled to the mounting flanges 36 for fixing the canister 14 to the instrument panel 12. The canister 14 also includes a plurality of tabs 42, generally illustrated in FIGS. 1 and 9, extending from the canister side walls 30 and 32 and a locking slot 50 in each wall. The locking slots 50 have an enlarged receiving section 52 and a tapered locking section 54 (FIG. 11b).

Figure 12A:
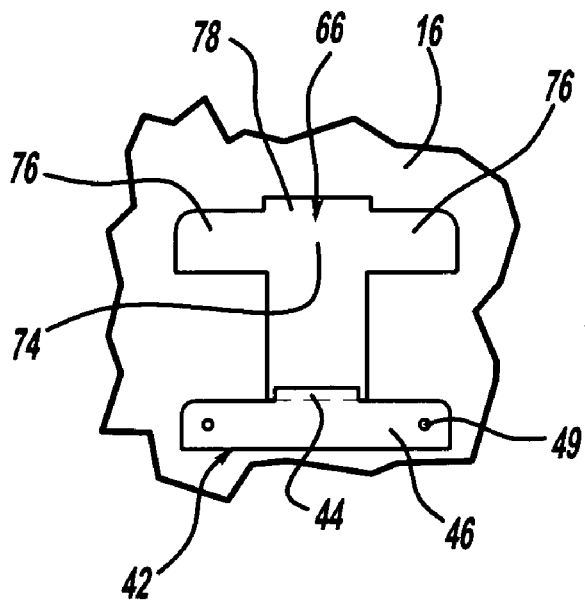
FIG. 12a is a plan view showing the location of a tab relative to a cover cutout when the cover is in a final installed position relative to the canister.
Figure 12B:
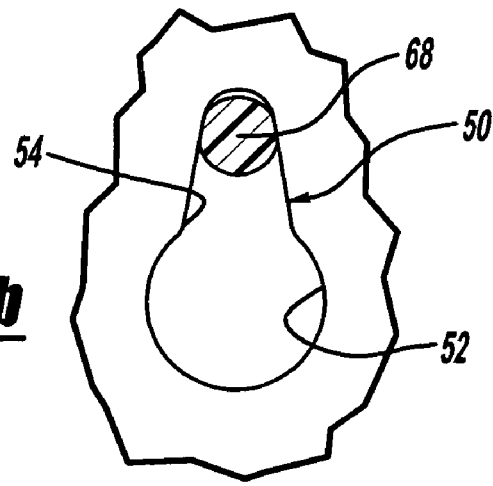
FIG. 12b is an enlarged view of the engagement of the locking nub in the tapered section of the locking slot when the cover is in its final installed position relative to the canister.
Figure 12C:
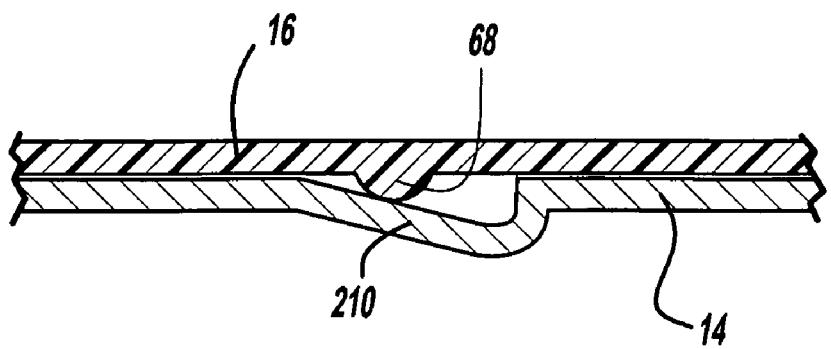
FIG. 12c is a sectional view of an alternate embodiment of the arrangement for the locking nub to engage a ramped recessed area.

Another embodiment of the locking arrangement shown in FIG. 12b may be used, and this alternate configuration is shown in cross section in FIG. 12c. According to this alternative arrangement, the nub 68 is located on the cover 16 as set forth above. As an alternative to the configuration of the locking slot 50 shown in FIG. 12b, the arrangement of FIG. 12c is not slotted but includes a ramped recessed area 210 defined in the canister 14. According to this arrangement, increasing interference is effected between the nub 68 and the inner surface of the ramped recessed area 210 as the cover 16 is installed on the canister 14.

The tabs 42 are preferably, though not necessarily, stamped or punched from the canister side walls 30 and 32, forming cavities 43. Each tab 42 in the illustrated embodiment includes a leg 44 extending from the canister side wall 30, 32 and wings 46 extending laterally on each side of the leg 44 (FIG. 9) and spaced from the canister side wall 30, 32, to form a passage 48 between the wings 46 and the canister side wall 30, 32 for receiving the cover 16 during assembly as hereinafter described (FIG. 5). The lateral extent 58 of the wings 46 is greater than the width 59 of the leg 44 so that the tabs 42 restrict movement of the cover 16 away from the canister 14 (i.e., peel off) as hereinafter described (FIG. 6). While the aspect ratio of the lateral extent 58 of the wings relative to the width 59 of the leg 44 may vary, in the two wing embodiments shown in the drawings the aspect ratio is greater than 1.0 and preferably, though not necessarily, in the range of 1.5 to 2.5. Those skilled in the art will appreciate that modifications to the illustrated tab configuration may be made without departing from the scope of the invention. By way of example rather than limitation, a single wing extending from one side of the leg, e.g., an "L" shaped tab, may be used, or the wings 46 may include a third wing extending away and substantially aligned with the leg 44.

Each wing 46 is also shown to include one or more dimples 49 projecting inward into the passage 48 (FIG. 6). The dimples 49 are sized such that, when the cover side walls 62, 64 are disposed in the passage 48, the dimples 49 act as cam elements to ride the tab 42 over the cover 16 after which the tab 42 is resiliently biased against the cover side walls. More particularly, the distance between the outer canister face 87 and the distal end 88 of each dimple 49 when the tab 42 is not deflected is less than the thickness 90 (FIG. 6) of the cover side wall 62, 64 in the area of the cutouts 66 to provide the localized cover compression. The localized cover compression creates a frictional engagement that contributes to maintaining the position of the cover 16 relative to the canister 14 and mitigate rattling (FIG. 6).

The cover 16 includes a face 60, first and second side walls 62 and 64, a locking nub 68, and first and second shoulders 70 and 71 (FIGS. 3 and 4) extending along the first and second side walls 62 and 64, respectively. The cover 16, specifically the side walls 62, 64, define the cutouts 66. The locking nub 68 protrudes from an inner face 82 of the cover side wall 62 and is configured to be received by the locking slot 50 of the canister 14. The cutouts 66 are configured to receive each of the respective tabs 42. In the illustrated embodiment, the tabs 42 have a generally "T"-shaped configuration and each cutout 66 includes a center opening 74 (FIG. 10), generally with a matching "T"-shaped opening having lateral cavities 76 extending from the center opening 74, and a cap section 78 extending past the lateral cavities 76 in a direction opposite the center opening 74. The cap sections 78 facilitate disposition of the tabs 42 in the cutouts 66 by accommodating the offset of the tab leg 44 during initial assembly of the cover 16 to the canister 14 as hereinafter described. In the illustrated embodiment, as is described herein, the tabs 42 are preferably created through a stamping process. However, other manufacturing techniques may be used, including those that would eliminate the offset of the tab leg 44, which may further optimize packaging space by locating the entire leg 44 under the tab wings. Those skilled in the art will appreciate that, should the tabs 42 be formed in a manner that does not include an offset, the cap section 78 may be eliminated.

A representative sequence for assembling the air bag module 10 and coupling the airbag module 10 to the instrument panel 12 will now be described with reference to FIGS. 10, 11a, 11b, 12a, and 12b. The cover 16 is coupled to the canister 14 by disposing the cutouts 66 over and about the tabs wings 46 and displacing the cover 16 toward the canister side wall 30, 32 such that the cover 16 is aligned with the passage 48 formed by the spacing of the wings 46 from the canister (FIG. 10). In this initial position, the wings 46 are aligned with the lateral cavity 76 of the cutouts 66 and the locking nub 68 is not yet disposed in the locking slot 50. The cover 16 is then displaced relative to the canister 14 in the assembly direction 84 (FIG. 3) until the nub 68 seats into the receiving section 52 (FIG. 11b) and the cutout lateral cavities 76 are no longer aligned with the tab wings 46 (FIG. 11a) to define a neutral position. In this position the cover 16 is coupled to the canister 14 while permitting further movement of the cover 16 relative to the canister 14 after the air bag module 10 is disposed within the instrument panel 12 as described below. During movement of the cover 16 from its initial position toward the neutral position, the cover 16 moves into the passages 48 and engages tab cam elements (such as the illustrated dimples 49) to deflect the tab 42. The tab 42 is then resiliently biased against the cover 16 to create a frictional force that resists movement of the cover 16 relative to the canister 14. The retention force caused by the elastic deformation of the tab 42 and its resilient bias against the cover 16 may be supplemented by the dimples 49 digging into the cover 16, causing elastic or inelastic deformation of the cover 16. Further, in this neutral position, the disposition of the locking nub 68 in the receiving section 52 of the locking slot 50 prevents inadvertent disassembly of the cover 16 from the canister 14 in that movement of the cover 16 opposite the assembly direction 84 is prevented by engagement of the locking nub 68 with the closed end 85 of the receiving section 52 (FIG. 7).

A further alternative configuration of the cover is shown in FIGS. 10a and 10b of which the latter is a sectional view of the former. In this embodiment, a ramped area 200 is provided on a pair of spaced-apart shoulders 202, 202' adjacent the center opening 74. According to this configuration the sloping arrangement provides increasing interference between the tab wings 46 (not shown) of the canister and the ramped area 200 of the cover as the latter is installed on the former.

Once assembled, the air bag module 10 (with the inflator 18 and air bag 20 in the cavity 22) is placed in the cavity 96 of the instrument panel 12 (FIG. 3) and the canister 14 is coupled to the instrument panel 12 by connecting the fasteners 38 to the cooperating elements 92 (FIG. 2) on the instrument panel 12. During connection of the fasteners 38, the canister 14 is drawn deeper into the instrument panel 12 (see arrow A in FIG. 2). The cover 16 moves with the canister 14 until the cover shoulders 70 and 71 contact shelves 94 and 95, respectively, on the instrument panel 12 (see FIGS. 3 and 4). Further tightening of the fasteners 38 causes displacement of the cover 16 relative to the canister 14 until the fasteners 38 are fully tightened (FIG. 4). This relative movement is accommodated by the configuration of the cutouts 66 and tabs 42 as well as the locking nub 68 and slot 50. More particularly, the tabs 42 are permitted to move further along the cutouts 66 away from the cap sections 78 and the locking nub 68 moves from the receiving section 52 and into the tapered section 54 of the locking slot 50 (FIGS. 12a and 12b).

As the tapered section 54 has a decreasing width 55, movement of the locking nub 68 therealong creates an increasing or progressive resistance. As is illustrated in the drawings, the receiving width 53 of the receiving section 52 is greater than the nub width 67 of the locking nub 68 to permit relatively free movement of the locking nub within the receiving section. The decreasing width 55 of the tapered section 54 narrows along its length from a magnitude equal to or slightly greater than the nub width 67 of the nub 68 at the receiving section 52 to magnitude less than the nub width 67 of the nub at a location remote from the receiving section 52. The material of the nub 68 is preferably selected such that the nub 68 undergoes elastic deformation when disposed in the tapered section 54 of the locking slot 50. For completeness, it is noted that when the cover 16 is moved from its initial position (FIG. 10) to its neutral position (FIG. 11a) the cover 16 is moved such that the tab wings 46 are entirely outside the envelope of the cutout lateral cavities 76, providing an overlap ratio of at least 1.0 and preferably on the order of 1.5 to 2.5. However, those skilled in the art will appreciate that the magnitude of the cover displacement may be varied without departing from the scope of the present invention.

It is to be understood that the final installed position of the tab 42 with respect to the center opening 74 of the cutout 66 shown in FIG. 12a is presented for illustrative purposes only. It may be that the final installed position of the tab is not at the end wall or stop point of the center opening 74 as illustrated in FIG. 12a. Instead, the final installed position of the tab 42 may be closer to the neutral position illustrated in FIG. 11a. The final installed position depends upon the final position of the cover 16 relative to the canister 14 when the two components are finally installed in the vehicle. By providing virtually an infinite range of final installed positions between the tab 42 and the cutout 66 optimal fit and finish may be achieved in the final assembly.

According to this arrangement, the final position of the cover 16 relative to the class A surface 98 of the instrument panel (FIGS. 2 and 4) is dictated by the position of the cover positioning shoulders 70 and 71 and the instrument panel shelves 94 and 95. Thus, the invention eliminates the impact of manufacturing deviations in the canister 14 and instrument panel 12, such as the positions of the canister mounting flanges 36 and the cooperating components of the instrument panel, thereby providing an improved fit and finish. Once assembled, the first and second connection mechanisms 102 and 104 limit movement of the cover 16 relative to the canister 14 to a single fore-aft plane, in the direction of and opposite to the assembly direction 84, and create retention forces that assist in preventing the cover 16 from standing proud of the instrument panel 12 after assembly and otherwise ensuring that the cover 16 remains in the desired position. More particularly, the first connection mechanism 102 creates a frictional retention force between the tab dimples 49 and the cover 16 to retain the cover 16 in the desired position. Similarly, the gradually reducing width of the tapered section 54 creates an increasing interference and frictional fit between the locking nub 68 and the canister 14 surrounding the tapered section 54 to provide a retention force that prevents the cover from moving relative to the canister 14 or instrument panel 12. The preferred elastic deformation of the nub 68 and the configuration of the tapered section 54 of the locking slot 50 also creates a restorative force that urges the cover 16 opposite the assembly direction 84 to seat the first and second shoulders 70 and 71 against the shelves 94 and 95. This restorative force acts to maintain the desired position of the cover 16 relative to the instrument panel 12, even in instances where an outside agency may attempt to move the cover away from the canister 14.

Still further, the interference between the tab wings 46 and the cover 16 prevents detachment of the cover 16 from the canister 14 in a direction perpendicular to the assembly direction 84 and away from the canister 14, commonly referred to as peel off. Additionally, should the cover 16 be displaced in a direction opposite the assembly direction 84, the engagement of the nub 68 with the closed end 85 of the receiving section 52 prevents the cover 16 from moving into a position where the tab wings 46 align with the lateral cutout cavities 76, thereby preventing detachment of the cover 16 from the canister 14. Still further, as the deployment of the air bag 20 creates forces tending to displace the cover 16 in the assembly direction 84, the coupling of the cover 16 to the canister 14 is strengthened by air bag deployment.

The attachment of the cover 16 to the canister 14 in the air bag module 10 of the present invention provides numerous advantages and benefits, including simplicity of installation, relatively low installation forces, and the elimination of any special assembly tools. Another benefit of the present invention is that the tab/cutout configuration of the first connection mechanism 102 permits adjustment of the position of the cover 16 relative to the canister 14, and therefore also relative to the instrument panel 12. This adjustable positioning permits effective alignment of the visible (class-A) surfaces of the cover 16 and instrument panel 12. In many conventional attachment techniques, the position of the cover 16 is fixed relative to the canister 14 thereby making the assembly susceptible to tolerance variation, including those resulting from the manufacture of the canister 14 and instrument panel 12. Further, one or both of the first and second connection mechanisms 102 and 104 provide a limited slip interface between the cover 16 and canister 14 that resists movement of the cover 16 in the direction opposite the assembly direction 84. The limited slip interface, whether provided solely by the first or second connection mechanisms 102 and 104 or the combination of such connection mechanisms, effectively prevents inadvertent uncoupling of the cover 16 and canister 14 until the point of assembly into the instrument panel 12. The limited slip interface also provides frictional resistance to cover movement during installation into the instrument panel 12, and prevents further movement thereafter. Absent a limited slip interface such as that provided by the first and/or second connection mechanism 102 and 104 described herein, a stimulus (e.g., consumer tampering) may cause the cover 16 to move in a direction opposite the assembly direction 84 and stand proud of the instrument panel 12, thereby negatively impacting the strict fit and finish originally obtained when the module is disposed within the instrument panel 12. It should be appreciated that while the air bag module 10 is illustrated herein as including both the first connection mechanism 102 (tab/cutout) and second connection mechanism 104 (nub/slot) in order to provide the most functionally effective module, the first and second connection mechanisms 102 and 104 may be used independent of one another. Due to the similarity and function of the first and second connection mechanisms 102 and 104, the tabs 42 and locking nub 68 are commonly referred to in the claims as a projection and the cutout 66 and locking slot 50 as an opening. As is described above, the configuration of the tab/nub and cutout/slot function to generally restrict the cover to force-aft movement relative to the canister 14. Further, the resilient bias of the tab 42 against the cover 16 and the engagement of the nub 68 in the tapered section 54 of the locking slot 50 creates forces that resist movement of the cover 16 relative to the canister 14 when the cover 16 is in its initial assembly or final assembled position.

Those skilled in the art will appreciate that the above described illustrated embodiment of the invention may be modified without departing from the general scope of the invention. For example, a variety of alternative configurations may be used to create the frictional engagement that resists cover movement. For example, while the dimples 49 are illustrated and described as facilitating the camming deflection of the tab 42 during disposition of the cover 16 in the passage 48, other configurations, such as ramped surfaces on the wing 46 or cover 16 may be used. Further, while the tabs 42 are illustrated and described herein as having a generally "T" shaped configuration defined by the leg 44 and wings 46, other tab configurations may be used. By way of example rather than limitation, the tabs 42 may include a single wing extending from one side of the leg, wings of equal size extending from each side of the leg as shown in the drawings, or different sized wings extending from each side of the leg. When selecting alternative configurations, those skilled in the art will appreciate that the size and configuration of the tabs 42 may vary depending upon the deployment strength and available packaging space for each particular application. The size, configuration, and number of tabs 42 may also vary depending on the compressive force against the cover necessary to prevent rattling as well as have an appropriate aspect ratio so as to prevent peel off. It is generally desirable to minimize the depth of the wing 46 and the required travel distance of the cover 16 relative to the canister 14 so as to minimize packaging space. Similarly, while the locking nub 68 is illustrated herein as having a generally cylindrical shape and the locking slot 50 as having a receiving section 52 and a tapered section 54, other configurations may be used in order to provide the desired limited slip interface. Further, while the nub 68 in the illustrated embodiment extends from the cover 16 and the locking slot 50 is formed in the canister 14, it should be appreciated that the nub could equally be provided in the canister 14 and the slot in the cover 16.

Another alternative configuration of the cover 16 and canister 14 is shown in FIGS. 13 and 14. In this embodiment, the tabs 42 are again formed in the canister 14 but the locking slot 150 has an elongated receiving section 152 (FIG. 14) and additional locking nubs 169 are provided on the cover side walls (FIG. 13). In this embodiment, during placement of the cover 116 into its initial position relative to the canister 14 (such as that shown in FIG. 10), the locking nubs (shown as 169*a* in FIG. 14) are outside the cavities 43 proximate the tabs 42 and the locking nub (shown as 68*a* in FIG. 14) is disposed in the elongated receiving section 152 (FIG. 14). When the cover 116 is displaced relative to the canister 14 and into the assembly direction 84, the locking nub 68 moves toward but not into the tapered section 154 (see nub position 68*b* in shadow) and the locking nubs are moved into the cavities 43 (see 169*b* in FIG. 14). By this configuration, the engagement of the nubs 169 with the end wall 173 of the associated canister cavities 43 prevent the cover from being moved opposite the assembly direction after being placed in the neutral position. Movement of the cover 116 relative to the canister 14 during coupling of the canister 14 to the instrument panel 12 causes the locking nub 68 to move into the tapered section 154 similar to that shown in FIG. 12*b* to restrain the cover against movement once the air bag module 10 is assembled to the instrument panel as described above. The embodiment illustrated in FIGS. 13 and 14 decouples the two functional features of the nub 68 provided in the previously described embodiment. That is, the nubs 169 limit movement of the cover opposite the assembly direction 84 when the cover is in its neutral position and the locking nub 68 in FIGS. 13 and 14 provide the interference fit/frictional engagement when the nub 68 engages the tapered slot 154. One of the benefits of using separate nubs for these two functions is that the nub 68 is not subject to deflection stress until the nub 68 engages the tapered slot 50 during final assembly of the airbag module 10 to the instrument panel 12. This ensures that the nub 68 remains in a virgin condition until engagement with the tapered slot 50 which may be desirable for certain material and nub geometries.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An airbag module comprising:
   a canister;
   a cover coupled to said canister, said canister and cover defining a cavity;
   a nub provided on one of said cover and canister;
   a slot provided on the other of said cover and said canister, the slot being a hole having a receiving section that is within the hole and an engaging section that is within the hole extending from said receiving section;
   wherein said nub is disposed in said receiving section when said cover is in a neutral position relative to said canister and, when said cover is moved relative to said canister in the direction toward a final installed position from said neutral position, said nub engages said engaging section to create a frictional force resisting movement of said cover relative to said canister.

2. An airbag module comprising:
   a canister;
   a cover coupled to said canister, said canister and cover defining a cavity, one of said cover and canister having a nub with a width and the other of said cover and said canister having a slot with a receiving section and a tapered section extending from said receiving section, said receiving section having a width that is larger than said nub width and said tapered section having a width that narrows as said tapered section extends from said receiving section;
   wherein said nub is disposed in said receiving section when said cover is in a neutral position relative to said canister and, when said cover is moved relative to said canister in the direction toward a final installed position from said neutral position, said nub is moved into said tapered section to create an increasing frictional force resisting movement of said cover relative to said canister, said frictional force increasing as said canister effects relative movement in a direction away from said cover;
   an inflator disposed in said cavity; and
   an air bag disposed in said cavity and operably associated with said inflator.

3. The air bag module of claim 2 wherein said nub extends from said cover and said slot is formed in said canister.

4. A method of assembling an airbag canister within a vehicle instrument panel comprising:
   coupling a cover to a canister by displacing the cover to a neutral position relative to the canister so as to realize limited slip interface between the cover and the canister;
   disposing tab wings on the canister into cutouts on the cover;
   displacing the cover until the tab wings are not aligned with the cutouts on the cover;
   engaging a locking nub on the cover into a receiving section of a locking slot on the canister;
   placing the canister with the cover in said neutral position within a cavity defined by an instrument panel of a vehicle;
   connecting the canister to the instrument panel with a fastener assembly;
   enabling adjustment of the cover relative to the canister after initial coupling of the airbag canister within the vehicle instrument panel;
   tightening the fastener assembly to securely couple the canister to the instrument panel; and
   displacing the cover to a final installed position relative to the canister.

5. The method of claim 4 wherein said step of placing the canister within the instrument panel further includes the step of engaging shoulders on the cover with shelves on the instrument panel.

6. The method of claim 5 wherein during said step of tightening the fastener assembly, the cover remains substantially stationary relative to said instrument panel.

7. The method of claim 5 wherein during said step of tightening the fastener assembly a bias force is created by the shoulders against the shelves to prevent movement of the cover relative to the instrument panel.

8. The method of claim 4 wherein during said step of coupling the cover to the canister, a resilient biasing force is created to maintain the neutral position of the cover relative to the canister during said steps of placing the canister and the coupled cover into the cavity of the instrument panel and connecting the canister to the instrument panel with the fastener assembly.

9. The airbag module according to claim 2, wherein the canister includes a side wall and a plurality of tabs extending from said side wall, each of said tabs having a leg and a wing extending from said leg and spaced from said side wall to define a passage, wherein the passage is maintained between the tabs and said side wall after assembly of the air bag module, wherein the cover includes a plurality of cutouts each having a center opening and a lateral cavity extending from said center opening, wherein the slot is configured so that said width of said tapered section at said receiving section is greater than said width of said nub and the width of said tapered section remote from said receiving section is less than said width of said nub, wherein each of said tabs is disposable in a cutout with said wings aligned with said lateral cavities when said cover is in an initial position relative to said canister, and wherein said cover is movable relative to said canister in the direction toward a final installed position from said initial position to a neutral position wherein said wings are offset from said lateral cavities.

* * * * *